Figure 1:
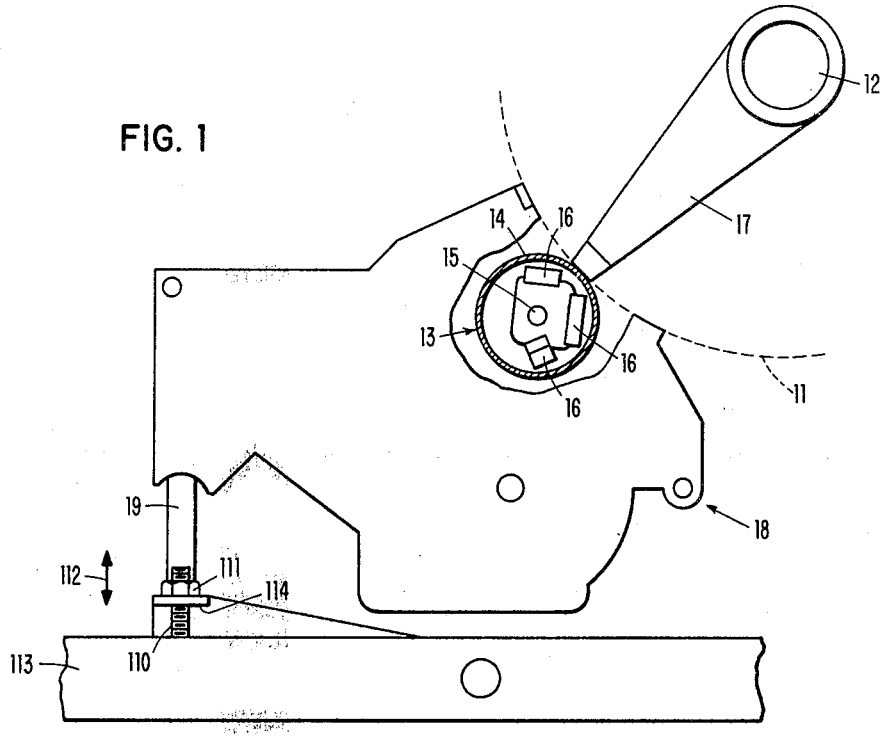
Figure 3:
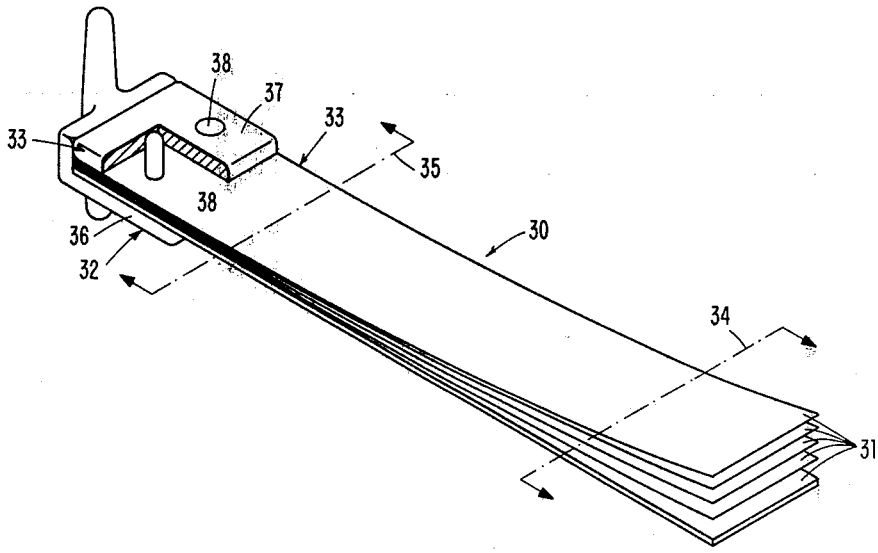
Figure 2:
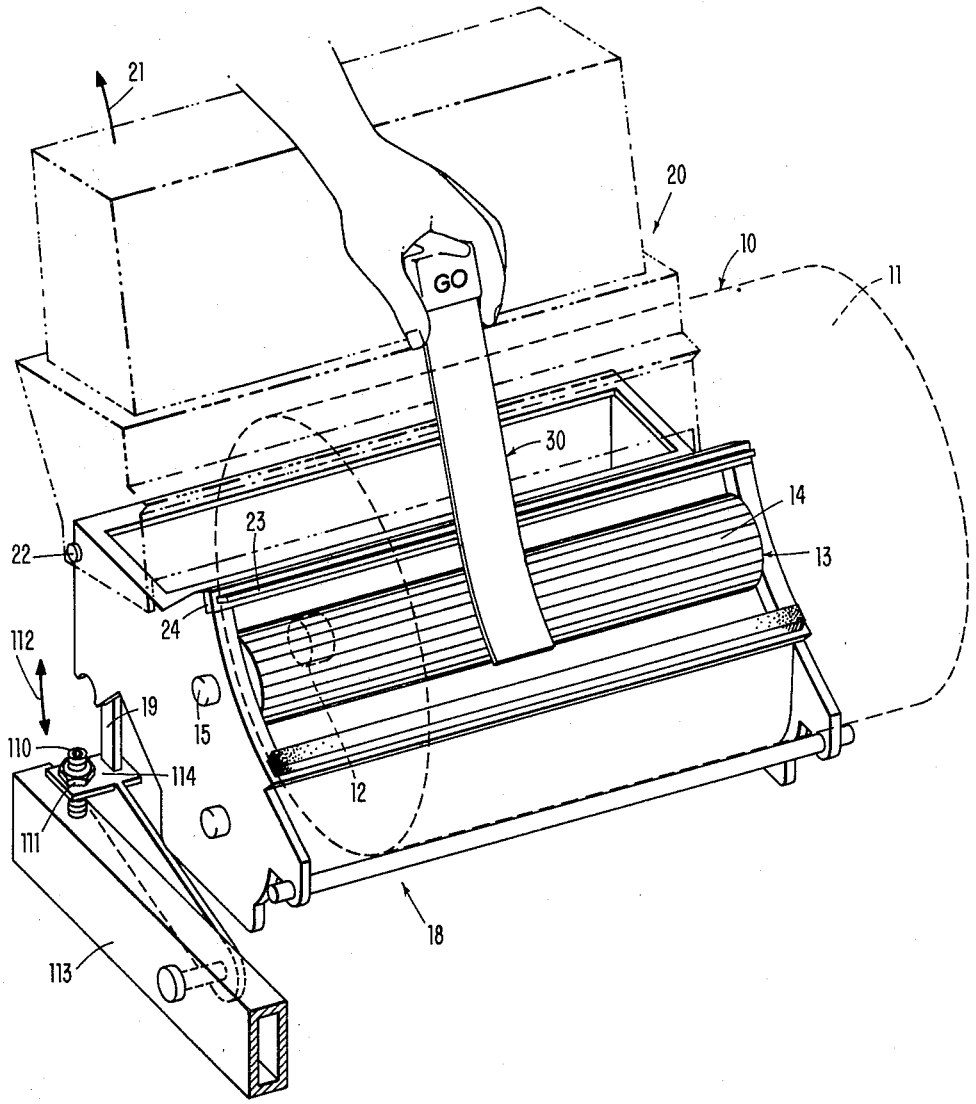

United States Defensive Publication [19] (H) [11] T101,801

Bierschbach et al. [43] May 4, 1982

[54] APPARATUS AND METHOD FOR ACCURATELY SETTING A GAP BETWEEN MATING SURFACES ON A COPIER MAGNETIC BRUSH DRUM AND ROLLER

[76] Inventors: James E. Bierschbach, 1431 S. Sherman St., Longmont, Colo. 80501; Raymond A. Daniels, 898 Pimlico Ct., Boulder, Colo. 80303; Robert L. Fey, 1222 Princeton Dr., Longmont, Colo. 80501; Ben A. Nilsson, 1125 Toedtli Dr., Boulder, Colo. 80303; Roberta R. Tanner, 2117 Logan La., Longmont, Colo. 80501

[21] Appl. No.: 182,241

[22] Filed: Aug. 28, 1980

[51] Int. Cl.[3] ..... G01B 3/30

[52] U.S. Cl. ..... 33/168 R

[57] ABSTRACT

An electrophotographic copier's magnetic brush roller applies developer material to the surface of a photoconductor drum. Two parallel centerlines define the photoconductor drum surface a fixed gap distance from the magnetic brush roller's mating surface. Moving the magnetic brush roller adjusts the gap distance between the mating surfaces. Two sandwiches of conventional, standard-thickness, flexible, plastic sheets form tools; one having a total thickness slighty larger than the desired gap between the mating surfaces of the drum and roller, and the other having a thickness slightly less than the desired gap. The desired gap is set by separating the drum and roller surfaces, inserting the tool that is slightly smaller than the gap and closing the gap sufficiently so that each of the mating surfaces on the drum and roller contacts one surface of the tool. The surfaces are then separated, the tool is withdrawn, and the second tool, which is slightly larger than the desired gap spacing, is inserted and the mating surfaces of the drum and roller are closed together until the second tool cannot be further inserted. The gap is accurately set when the first tool may be pushed into the gap, without buckling, but the second tool may not.

3 Claims, 2 Sheets Drawing,

12 Pages Specification

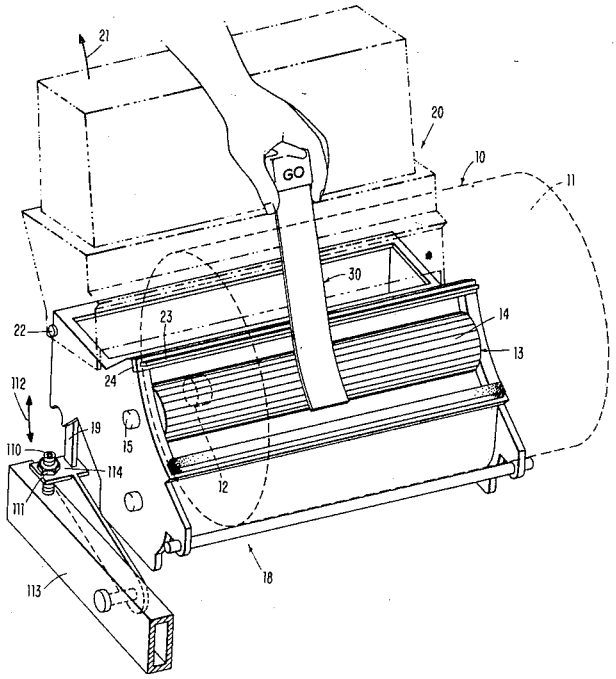

The file of this unexamined application may be inspected and copies thereof may be purchased (849 O.G. 1221, Apr. 9, 1968).